United States Patent
Nakamura et al.

(10) Patent No.: US 9,939,782 B2
(45) Date of Patent: Apr. 10, 2018

(54) HOLOGRAM RECORDING DEVICE

(71) Applicant: FUJI XEROX CO., LTD., Tokyo (JP)

(72) Inventors: Shigetoshi Nakamura, Kanagawa (JP); Jiro Minabe, Kanagawa (JP); Yasuhiro Ogasawara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 116 days.

(21) Appl. No.: 15/226,193

(22) Filed: Aug. 2, 2016

(65) Prior Publication Data

US 2017/0269549 A1 Sep. 21, 2017

(30) Foreign Application Priority Data

Mar. 18, 2016 (JP) .................. 2016-056163

(51) Int. Cl.
*G03H 1/26* (2006.01)
*G03H 1/04* (2006.01)
*G03H 1/06* (2006.01)
*G03H 1/28* (2006.01)

(52) U.S. Cl.
CPC .......... *G03H 1/268* (2013.01); *G03H 1/0465* (2013.01); *G03H 1/06* (2013.01); *G03H 1/2645* (2013.01); *G03H 1/28* (2013.01); *G03H 2001/266* (2013.01)

(58) Field of Classification Search
CPC ........ G03H 1/268; G03H 1/0465; G03H 1/06; G03H 1/2645; G03H 1/28; G03H 2001/266
USPC ........................................... 359/23
See application file for complete search history.

(56) References Cited

FOREIGN PATENT DOCUMENTS

JP    2008-197246 A    8/2008

OTHER PUBLICATIONS

Masami Takano et al., "Full-Color Holographic 3D Printer", Proceedings of SPIE—IS&T Electronic Imaging, SPIE, 2003, pp. 126-136, vol. 5005.
Hans Bjelkhagen et al., "Ultra-Realistic Imaging: Advanced Techniques in Analogue and Digital Colour Holography", 2013, CRC-Press, pp. 142-145.
Makoto Sato, "Principle of the Hologram Printer and the Applied Example", Imaging Conference Japan, 2014, pp. 203-206.

*Primary Examiner* — Bumsuk Won
*Assistant Examiner* — Wen Huang
(74) *Attorney, Agent, or Firm* — Sughrue Mion, PLLC (57) ABSTRACT

A hologram recording device includes a light outputting unit, which sequentially outputs laser beams having different wavelengths such that the laser beams are coaxial and includes an optical member and laser beam sources, and a recording unit, which sequentially irradiates the recording medium with the laser beams to record holograms in a multiwavelength superimposing manner. The optical member includes optical elements that reflect, in the optical direction, a laser beam incident thereon in a direction crossing the optical axis direction, and that allow a laser beam incident thereon in the optical axis direction to pass therethrough. The laser beam sources radiate laser beams to the optical member, and are arranged so that a laser beam emitted from a laser beam source among the laser beam sources that exposes a recording medium for a longer exposure period with the laser beam passes through a smaller number of optical elements.

2 Claims, 4 Drawing Sheets

HOLOGRAM RECORDING DEVICE

CROSS-REFERENCE TO RELATED APPLICATIONS

This application is based on and claims priority under 35 USC 119 from Japanese Patent Application No. 2016-056163 filed Mar. 18, 2016.

BACKGROUND

Technical Field

The present invention relates to hologram recording devices.

SUMMARY

According to an aspect of the present invention, a hologram recording device includes a light outputting unit and a recording unit. The light outputting unit sequentially outputs multiple laser beams having different wavelengths such that the laser beams are coaxial with one another. The light outputting unit includes an optical member and multiple laser beam sources. The optical member includes multiple optical elements and is disposed so that the optical elements are arranged in an optical axis direction, the optical elements reflecting, in the optical direction, a laser beam incident thereon in a direction crossing the optical axis direction, the optical elements allowing a laser beam incident thereon in the optical axis direction to pass therethrough. The laser beam sources emit multiple laser beams having different wavelengths, radiate the laser beams to the optical member, and are arranged so that a laser beam source emits a laser beam that passes through a smaller number of optical elements to expose a recording medium for a longer exposure period with the laser beam. The recording unit sequentially irradiates the recording medium with the laser beams, which have different wavelengths and are sequentially output from the light outputting unit so as to be coaxial with one another, for use as recording beams to record multiple holograms in a multiwavelength superimposing manner.

BRIEF DESCRIPTION OF THE DRAWINGS

An exemplary embodiment of the present invention will be described in detail based on the following figures, wherein.

DETAILED DESCRIPTION

Referring now to the drawings, an exemplary embodiment of the invention is described in detail below.

Principle of Holographic Stereogram

Now, the principle of a holographic stereogram is described first.

One way of displaying a three-dimensional image is a holographic stereogram. A holographic stereogram is produced by acquiring two-dimensional images of an object photographed from different viewpoints slightly shifted from one another as original images, reconstructing the acquired multiple original images to generate multiple display images that are displayed on a display device, and sequentially recording the generated multiple display images on one hologram recording medium as multiple component holograms. In the following description, original images and display images are collectively referred to as "parallax images".

Figure 1A:
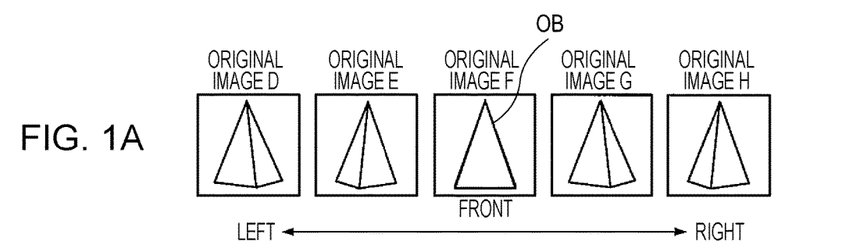
FIGS. 1A and 1B are schematic diagrams of an example of original images.
Figure 1B:
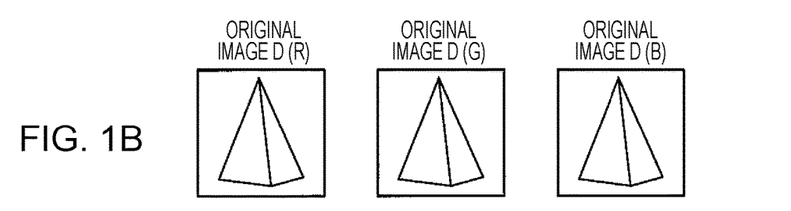

FIG. 1A is a schematic diagram of an example of original images. In this example, a quadrangular pyramid is used as an object OB and the object OB is photographed from different viewpoints slightly shifted from one another in the horizontal direction. An image of the object OB photographed from the front is an original image F. An image of the object OB photographed from obliquely left in the horizontal direction is an original image E and an image of the object OB photographed from a position rotated further leftward from the position at which the original image E is photographed is an original image D. An image of the object OB photographed from obliquely right in the horizontal direction is an original image G and an image of the object OB photographed from a position rotated further rightward from the position at which the original image G is photographed is an original image H. As illustrated in FIG. 1B, in the case of forming a full-color holographic stereogram, an original image of red (R), an original image of green (G), and an original image of blue (B) are generated from each of the original images D, E, F, and G.

Figure 2:
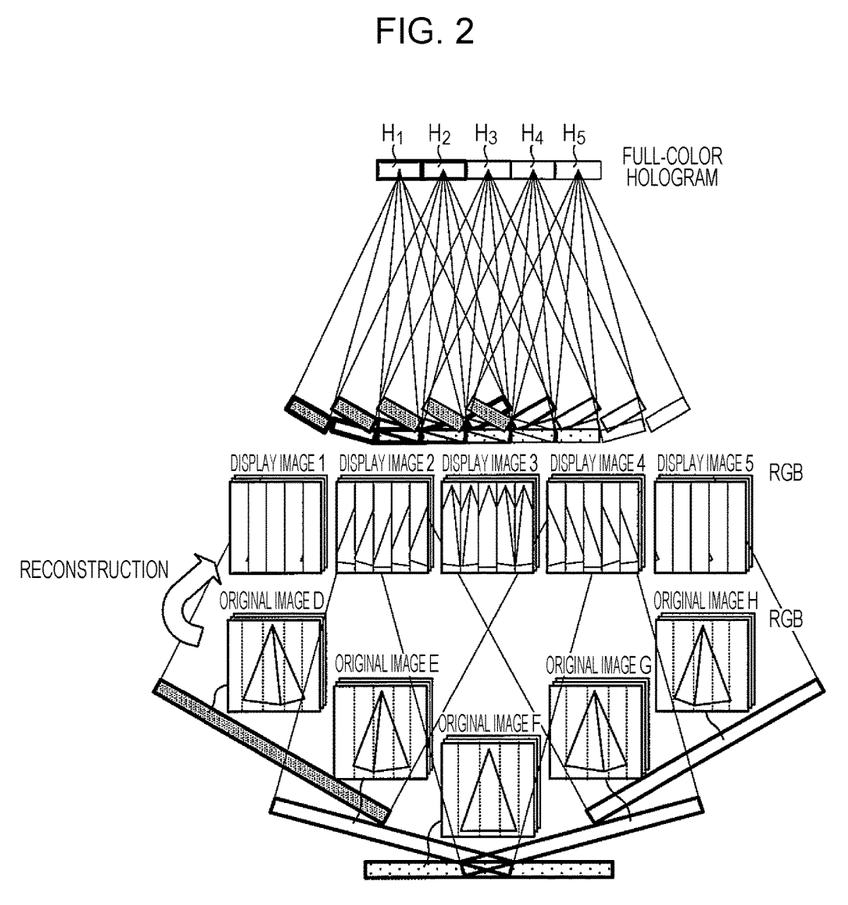
FIG. 2 is a schematic diagram for illustrating the principle of a holographic stereogram.

FIG. 2 is a schematic diagram illustrating the principle of a holographic stereogram. For example, to form a holographic stereogram having horizontal parallax information, an object OB is sequentially photographed from different viewpoints slightly shifted from one another in the horizontal direction as illustrated in FIG. 2, so that the original images D, E, F, G, and H are acquired. Each of the original images D to H is separated by colors to generate R, G, and B original images.

Subsequently, these original images D to H are reconstructed per color to generate display images 1, 2, 3, 4, and 5. In the case of forming a full-color holographic stereogram, red (R) display images 1R, 2R, 3R, 4R, and 5R are generated from red (R) original images of the original images D to H, green (G) display images 1G, 2G, 3G, 4G, and 5G are generated from green (G) original images of the original images D to H, and blue (B) display images 1B, 2B, 3B, 4B, and 5B are generated from blue (B) original images of the original images D to H. Unless red (R), green (G), and blue (B) need to be distinguished from one another, these display images are collectively referred to as display images 1, 2, 3, 4, and 5.

In this example, each original image is divided into five segments in the horizontal direction and then an image acquired by arranging n-th (n is an integer from one to five) pixel columns of the original images D to H from the left in this order serves as a display image n. Then, display images 1 to 5 are sequentially recorded on a hologram recording medium as strip-shaped component holograms H1, H2, H3, H4, and H5.

In a full-color holographic stereogram, R, G, and B display images are recorded on one component hologram in a multiwavelength superimposing manner using laser beams of different wavelengths corresponding to colors red, green, and blue. For example, what is obtained by sequentially recording a hologram on which R display images 1R are recorded, a hologram on which G display images 1G are recorded, and a hologram on which B display images 1B are recorded in a superimposing manner serves as a component hologram H1. The order in which a recording medium is exposed to R, G, and B laser beams are not limited to the described order.

Image surfaces of the original images D to H correspond to a surface of the hologram recording medium constituted of the component holograms H1 to H5. The converging angles of the display images 1 to 5 correspond to observation angles at which an observer observes the hologram recording medium. Specifically, angle dependence information of each pixel column of the display image is recorded. Thus, by reproducing the component holograms H1 to H5, the entirety of the hologram (that is, the original images D to H) is reproduced, whereby a three-dimensional image of the object OB is recognized by an observer. In the case where the hologram is a full-color holographic stereogram, a full-color three-dimensional image is recognized by an observer.

In this exemplary embodiment, when a full-color holographic stereogram is to be manufactured, optical axes of three-color laser beams output from the R, G, and B laser beam sources are superimposed together so as to be coaxially aligned using optical elements such as dichroic mirrors. Thus, a common optical system and a common spatial light modulator (SLM) are usable to record three holograms corresponding to three colors of R, G, and B with the R, G, and B laser beams in a multiwavelength superimposing manner on a component hologram.

In the case where the R, G, and B laser beam sources are used, the exposure period required for acquiring a white hologram by additive mixing is calculated for each laser beam source in accordance with the characteristics of the laser beam source such as an oscillation wavelength and an output intensity and the wavelength sensitive characteristics of a recording medium that is to be used. Here, the "exposure period" represents a period for which a recording medium is irradiated with a laser beam to record a hologram. The calculated exposure period is referred to as a "required exposure period". Here, the "required exposure period" is calculated on the assumption that the optical element does not cause any optical loss.

An optical element used for an optical axis alignment has a reflectance of as high as approximately 100% but may have a transmittance lower than the reflectance. For example, a commercially available dichroic mirror has a transmittance of as low as approximately 90%. Thus, when a laser beam passes through the optical element, an optical loss occurs, so that an actual exposure period becomes longer than the calculated required exposure period. To address this situation, in this exemplary embodiment, the required exposure period for each of R, G, and B laser beam sources is calculated in advance and the laser beam sources are arranged so that a laser beam source emits a laser beam that passes through a smaller number of optical elements to expose a recording medium for a longer exposure period with the laser beam.

This configuration reduces an optical loss while a component hologram in which R, G, and B holograms are recorded in a superimposing manner is recorded. Thus, the total period of exposure with the R, G, and B laser beams becomes shorter than that in the case where the R, G, and B laser beam sources are arranged in other orders. Here, the "total exposure period" is the sum of "actual exposure periods" calculated on the basis of measurement or in consideration of the optical loss in the R, G, and B laser beam sources.

Hologram Recording Device

Figure 3:
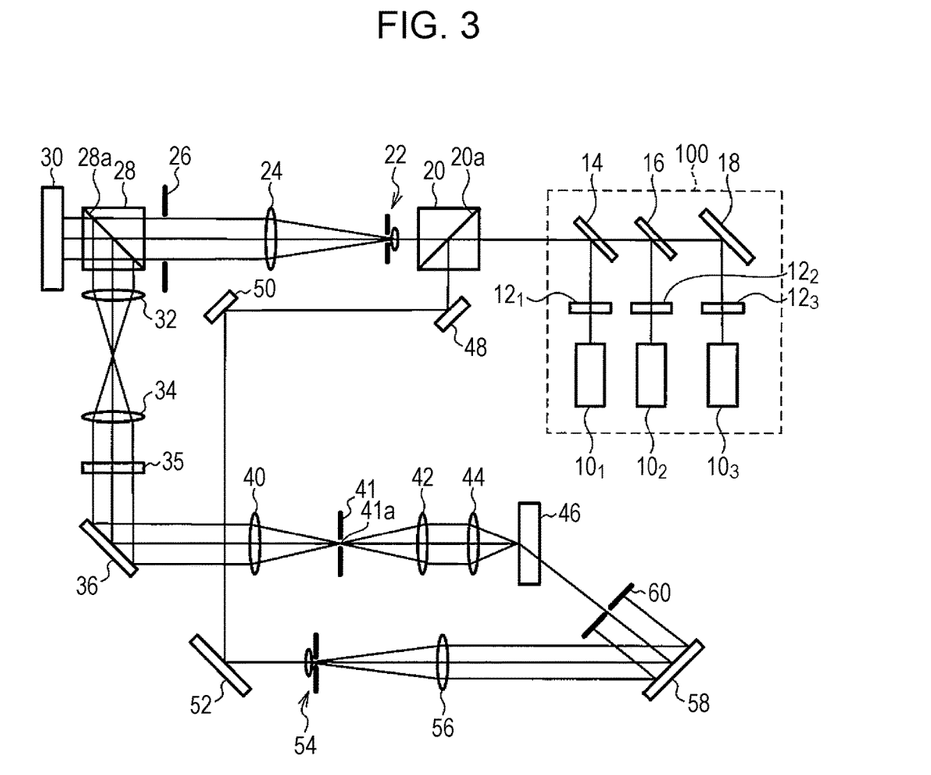
FIG. 3 is a configuration diagram of an example of the configuration of a hologram recording device.

The following describes a device that manufactures a holographic stereogram (the device is hereinafter simply referred to as a "hologram recording device"). FIG. 3 is a configuration diagram of an example of the configuration of a hologram recording device. In this exemplary embodiment, a hologram recording device that manufactures holographic stereograms having horizontal parallax information is described. FIG. 3 is a top view of the hologram recording device.

As illustrated in FIG. 3, the hologram recording device includes a laser-beam emitting portion 100 that sequentially emits multiple laser beams having different wavelengths by switching multiple laser beam sources 10 one to another while the laser beams are coaxial with one another. The laser-beam emitting portion 100 includes a first laser beam source $10_1$, a second laser beam source $10_2$, a third laser beam source $10_3$, shutters $12_1$, $12_2$, and $12_3$ disposed so as to correspond to the respective laser beam sources $10_1$, $10_2$, and $10_3$, a first optical element 14 disposed so as to correspond to the first laser beam source $10_1$, a second optical element 16 disposed so as to correspond to the second laser beam source $10_2$, and a mirror 18 disposed so as to correspond to the third laser beam source $10_3$.

The laser beam source $10_1$, the second laser beam source $10_2$, and the third laser beam source $10_3$ are laser beam sources that emit laser beams of different oscillation wavelengths and different output intensities. Examples usable as the laser beam sources include a semiconductor-excited solid-state laser. Unless the laser beam sources need to be distinguished from one another, they are collectively referred to as laser beam sources 10.

The shutters $12_1$, $12_2$, and $12_3$ are disposed on the light emission side of the corresponding laser beam sources 10 so as to be interposable into the optical paths of the laser beams or so as to be retractable from the optical paths. When closed, the shutters $12_1$, $12_2$, and $12_3$ are interposed into the optical paths to block the laser beams. When opened, the shutters $12_1$, $12_2$, and $12_3$ are retracted from the optical paths to allow the laser beams to pass thereby. As described below, the R, G, and B laser beams are sequentially emitted in a time division manner. Only a shutter 12 corresponding to the laser beam source 10 that emits a laser beam is opened to allow the laser beam to pass thereby. Unless the shutters $12_1$, $12_2$, and $12_3$ need to be distinguished from one another, they are collectively referred to as shutters 12.

Each of the first optical element 14 and the second optical element 16 is an optical element that allows a laser beam incident thereon in the optical axis direction to pass therethrough, reflects, in the optical axis direction, a laser beam incident thereon in a direction that crosses the optical axis direction, and aligns together the optical axes of the laser beams incident thereon in two directions. Examples usable as an optical element for optical axis alignment include a dichroic mirror and a polarization beam splitter.

The first optical element 14 reflects, in the optical axis direction, a laser beam incident thereon in a first direction and allows a laser beam incident thereon in the optical axis direction to pass therethrough to output the laser beam. The second optical element 16 reflects, in the optical axis direction, a laser beam incident thereon in a second direction to cause the laser beam to be incident on the first optical element 14, and allows a laser beam incident thereon in the optical axis direction to pass therethrough to cause the laser beam to be incident on the first optical element 14.

In this exemplary embodiment, the first laser beam source $10_1$ radiates a laser beam to the first optical element 14 in the first direction. The second laser beam source $10_2$ radiates a laser beam to the second optical element 16 in the second direction. The third laser beam source 10₃ radiates a laser beam to the second optical element 16 in the optical axis direction.

A laser beam emitted from the third laser beam source 10₃ is reflected by the mirror 18 in the optical axis direction and incident on the second optical element 16 in the optical axis direction. Then, the laser beam passes through the second optical element 16 and the first optical element 14 and is output from the laser-beam emitting portion 100.

A laser beam emitted from the second laser beam source 10₂ is reflected by the second optical element 16 in the optical axis direction, aligned so as to be coaxial with the laser beam emitted from the third laser beam source 10₃, and then incident on the first optical element 14 in the optical axis direction. Thereafter, the laser beam passes through the first optical element 14 and is output from the laser-beam emitting portion 100.

A laser beam emitted from the first laser beam source 10₁ is reflected by the first optical element 14 in the optical axis direction, aligned so as to be coaxial with the laser beam emitted from the third laser beam source 10₃ and the laser beam emitted from the second laser beam source 10₂, and output from the laser-beam emitting portion 100.

Laser beams emitted from the first laser beam source 10₁ pass through no optical element. Laser beams emitted from the second laser beam source 10₂ pass through one optical element. Laser beams emitted from the third laser beam source 10₃ pass through two optical elements. In other words, laser beams emitted from the first laser beam source 10₁ never passes through the optical element.

On the other hand, a required exposure period for which a recording medium is exposed with a laser beam emitted by a blue laser beam source of a 50-milliwatt (mW) output, which is used in this exemplary embodiment and emits blue laser beams of a wavelength of 473 nanometers (nm), is 140 milliseconds (ms). A required exposure period for which a recording medium is exposed with a laser beam emitted by a red laser beam source of a 150-mW output, which is used in this exemplary embodiment and emits red laser beams of a wavelength of 640 nm, is 44 ms. A required exposure period for which a recording medium is exposed with a laser beam emitted by a green laser beam source of a 300-mW output, which is used in this exemplary embodiment and emits green laser beams of a wavelength of 532 nm, is 10 ms. Here, the characteristics of each laser beam source are specified for illustration purpose and the laser beam sources are not limited to the above-described sources.

In this exemplary embodiment, a laser beam emitted from a laser beam source that exposes a recording medium with the laser beam for a longer required exposure period passes through a smaller number of optical elements. Thus, a blue laser beam source exposing a recording medium with a laser beam for a required exposure period of 140 ms is used as the first laser beam source 10₁ that emits laser beams that pass through no optical element. A red laser beam source exposing a recording medium with a laser beam for a required exposure period of 44 ms is used as the second laser beam source 10₂ that emits laser beams that pass through one optical element. A green laser beam source exposing a recording medium with a laser beam for a required exposure period of 10 ms is used as the third laser beam source 10₃ that emits laser beams that pass through two optical elements.

The laser-beam emitting portion 100 having the above-described configuration sequentially switches the first laser beam source 10₁, the second laser beam source 10₂, and the third laser beam source 10₃ one to another to sequentially emit R, G, and B laser beams in a time division manner. The laser beam sources 10 are switched one to another by opening and closing the corresponding shutters 12. Three holograms corresponding to the three colors of R, G, and B are recorded using the R, G, and B laser beams in a multiwavelength superimposing manner on a component hologram.

A polarization beam splitter 20 is disposed on the light emission-side of the laser-beam emitting portion 100. The polarization beam splitter 20 includes a reflection surface 20a that, for example, allows p-polarized beams to pass therethrough and reflects s-polarized beams. The polarization beam splitter 20 splits a laser beam into two types of light, that is, light for an object beam and light for a reference beam. The light that has passed through the polarization beam splitter 20 becomes light for an object beam (p-polarized beam) and the light that has been reflected by the polarization beam splitter 20 becomes light for a reference beam (s-polarized beam).

An optical system that generates an object beam is described first. On the light transmission side of the polarization beam splitter 20, a spatial filter 22, a lens 24, a slit 26, and a polarization beam splitter 28 are arranged in this order from the polarization beam splitter 20 along the optical path. The spatial filter 22 and the lens 24 collimate light that has passed through the polarization beam splitter 20. The slit 26 shapes the collimated light into a rectangle and causes the light to be incident on the polarization beam splitter 28. The polarization beam splitter 28 includes a reflection surface 28a that allows p-polarized beams to pass therethrough and reflects s-polarized beams.

A reflective display device 30 is disposed on the light transmission side of the polarization beam splitter 28. The display device 30 includes multiple pixels driven independently of one another and displays images corresponding to image information by modulating, per pixel, at least one of the amplitude, the angular position, and the light polarization direction of incident light. Examples usable as the display device 30 include a spatial light modulator. In this exemplary embodiment, a reflective liquid crystal spatial light modulator (liquid crystal on silicon or LCOS) is used to display images over its display area.

When light for an object beam is modulated and reflected by the display device 30, an object beam for use as hologram recording is generated. The object beam reflected by the display device 30 is converted from a p-polarized beam to an s-polarized beam and caused to be incident on the polarization beam splitter 28 again. The object beam (s-polarized beam) is then reflected by the reflection surface 28a of the polarization beam splitter 28.

A lens 32, a lens 34, a diffusion member 35, and a mirror 36 are arranged on the light reflection side of the polarization beam splitter 28 in this order from the polarization beam splitter 28 along the optical path. The object beam reflected by the polarization beam splitter 28 is relayed by the lenses 32 and 34, diffused by the diffusion member 35, and radiated to the mirror 36. The mirror 36 changes the direction of the optical path of the object beam toward a hologram recording medium 46.

A lens 40, a light-shielding plate 41 having an aperture 41a, a lens 42, and a condenser lens 44 are arranged between the mirror 36 and the hologram recording medium 46 in this order from the mirror 36 along the optical path. For example, a cylindrical lens that condenses incident light in only a linear direction (horizontal direction) is used as the condenser lens 44.

Here, the direction parallel to the plane of FIG. 3 corresponds to the "horizontal direction". Strip-shaped component holograms are recorded such that their lengthwise direction corresponds to the "vertical direction" and their widthwise direction corresponds to the "horizontal direction". The hologram recording medium 46 is held by a holding member, not illustrated. The hologram recording medium 46 is moved in the horizontal direction by a moving device, not illustrated, every time after recording of one component hologram is finished.

The diffusion member 35 diffuses the object beam that has passed therethrough such that the object beam is enlarged to a larger extent in the vertical direction than in the horizontal direction by the light diffraction principle. The object beam that has passed through the diffusion member 35 is reflected by the mirror 36, relayed by the lenses 40 and 42, condensed by the condenser lens 44 in only the horizontal direction, and radiated to the hologram recording medium 46.

Now, an optical system that generates a reference beam is described. A mirror 48, a mirror 50, a mirror 52, a spatial filter 54, a lens 56, a mirror 58, and a slit 60 are arranged on the light reflection side of the polarization beam splitter 20 in this order from the polarization beam splitter 20 along the optical path. The mirrors 48, 50, and 52 change the direction of the optical path of the light for a reference beam (hereinafter the light is referred to as a "reference beam") toward the spatial filter 54.

The spatial filter 54 and the lens 56 enlarge and collimate the light reflected by the mirror 52 and radiate the collimated reference light to the mirror 58. The mirror 58 reflects the collimated reference light and changes the direction of the optical path of the reference light toward the hologram recording medium 46. The slit 60 shapes the reference beam into a rectangle and the reference beam that has passed through the slit 60 is radiated to the hologram recording medium 46.

In this exemplary embodiment, the reference beam is radiated to the hologram recording medium 46 in a direction different from the direction in which the object beam is radiated. By radiating the reference beam in the direction different from the direction in which the object beam is radiated, a reflective hologram is recorded. In addition, the reference beam is radiated such that the optical axis of the reference beam and the optical axis of the object beam cross each other inside the hologram recording medium 46. The above optical system is shown as an example and components such as lenses or mirrors may be omitted or added in accordance with the design of the optical system.

Figure 4:
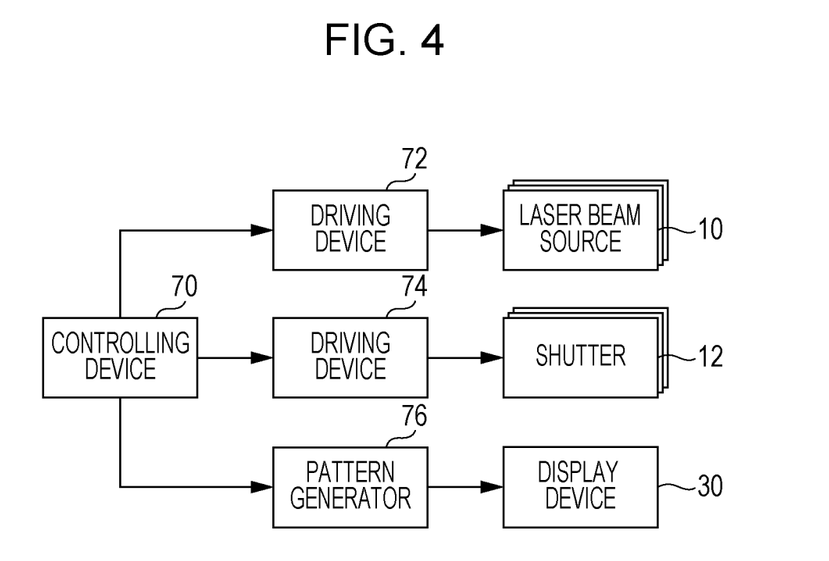
FIG. 4 is a configuration diagram of an example of the electric configuration of the hologram recording device.

Subsequently, an electric configuration of the hologram recording device is described. FIG. 4 is a block diagram of an example of an electric configuration of the hologram recording device. The hologram recording device includes a controlling device 70 that controls the entirety of the device. The controlling device 70 is formed of a computer and includes a central processing unit (CPU), a read only memory (ROM) that stores various programs, a random access memory (RAM) that is used as a work area in the execution of the programs, and a nonvolatile memory that stores various types of information.

The laser beam sources 10 are connected to the controlling device 70 with a driving device 72 interposed therebetween. The driving device 72 turns on the laser beam sources 10 in response to commands from the controlling device 70. The shutters 12 are also connected to the controlling device 70 with a driving device 74 interposed therebetween. The driving device 74 opens and closes the shutters 12 in response to commands from the controlling device 70.

The display device 30 is also connected to the controlling device 70 with a pattern generator 76 interposed therebetween. The pattern generator 76 generates patterns in accordance with image information supplied from the controlling device 70. Multiple pixels of the display device 30 modulate incident light in accordance with the patterns, so that images corresponding to the image information are displayed. Moving devices, not illustrated, are also driven by driving devices, not illustrated, on the basis of a command from the controlling device 70.

Now, the hologram recording process is described. In this exemplary embodiment, G, R, and B laser beams are emitted in this order so that three holograms corresponding to the three colors of R, G, and B are recorded in a multiwavelength superimposing manner with the R, G, and B laser beams on a component hologram. The shutters 12 are closed until they are driven to be open.

The driving device 72 turns on the first laser beam source $10_1$, the second laser beam source $10_2$, and the third laser beam source $10_3$. The driving device 74 opens the shutter $12_3$ first to allow a green laser beam to pass thereby. Thus, the green laser beam is radiated from the third laser beam source $10_3$. Concurrently, the controlling device 70 supplies green image information to the pattern generator 76, causes the display device 30 to display a green display image at a predetermined timing, and records the green display image on the hologram recording medium 46 for use as a hologram.

Specifically, the green laser beam emitted from the third laser beam source $10_3$ is reflected by the mirror 18, passes through the second optical element 16 and the first optical element 14, and is incident on the polarization beam splitter 20. The green laser beam (p-polarized beam) that has passed through the polarization beam splitter 20 passes through the optical system that generates object beams and is changed into an object beam modulated in accordance with a green display image displayed on the display device 30. On the other hand, the green laser beam (s-polarized beam) reflected by the polarization beam splitter 20 passes through the optical system that generates reference beams and is changed into a reference beam. The object beam and the reference beam generated from the green laser beam are simultaneously radiated to the hologram recording medium 46 for a required exposure period of 10 ms. With interference between the object beam and the reference beam, a green component of a component hologram is recorded.

Subsequently, the driving device 74 closes the shutter $12_3$ and opens the shutter $12_2$ to allow a red laser beam to pass thereby. Thus, the red laser beam is radiated from the second laser beam source $10_2$. Concurrently, the controlling device 70 supplies red image information to the pattern generator 76, causes the display device 30 to display a red display image at a predetermined timing, and records the red display image on the hologram recording medium 46 for use as a hologram.

The red laser beam emitted from the second laser beam source $10_2$ is reflected by the second optical element 16, aligned so as to be coaxial with the green laser beam, caused to pass through the first optical element 14, and radiated to the polarization beam splitter 20. An object beam and a reference beam are generated from the red laser beam in the same manner as in the case of the green laser beam except for this process. The object beam and the reference beam generated from the red laser beam are simultaneously radiated to the hologram recording medium 46 for a required exposure period of 44 ms. With interference between the object beam and the reference beam, a red component of the component hologram is recorded.

Subsequently, the driving device 74 closes the shutter 12₂ and opens the shutter 12₁ to allow a blue laser beam to pass therebby. Thus, the blue laser beam is radiated from the second laser beam source 10₁. Concurrently, the controlling device 70 supplies blue image information to the pattern generator 76, causes the display device 30 to display a blue display image at a predetermined timing, and records the blue display image on the hologram recording medium 46 for use as a hologram.

The blue laser beam emitted from the first laser beam source 10₁ is reflected by the first optical element 14, aligned so as to be coaxial with the green and red laser beams, and incident on the polarization beam splitter 20. An object beam and a reference beam are generated from the blue laser beam in the same manner as in the case of the green laser beam except for this process. The object beam and the reference beam generated from the blue laser beam are simultaneously radiated to the hologram recording medium 46 for a required exposure period of 140 ms. With interference between the object beam and the reference beam, a blue component of the component hologram is recorded.

As described above, multiple holograms corresponding to the red, green, and blue display images are recorded in a multiwavelength superimposing manner with the red, green, and blue laser beams. Thus, a component hologram of a full-color holographic stereogram is recorded. In addition, by moving the hologram recording medium 46 in the horizontal direction, multiple component holograms are sequentially recorded on the hologram recording medium 46 so as to be arranged in the horizontal direction.

Reduction of Total Exposure Period

Subsequently, reduction of the total exposure period is verified.

In this exemplary embodiment, in order that a laser beam emitted from a laser beam source exposing a recording medium with a laser beam for a required exposure period passes through a smaller number of optical elements, a blue laser beam source exposing a recording medium with a laser beam for a required exposure period of 140 ms is used as the first laser beam source 10₁, a red laser beam source exposing a recording medium with a laser beam for a required exposure period of 44 ms is used as the second laser beam source 10₂, and a green laser beam source exposing a recording medium with a laser beam for a required exposure period of 10 ms is used as the third laser beam source 10₃. Whether the total exposure period is reduced in this case is verified.

For comparison, Table 1 shows the results obtained in cases where the R, G, and B laser beam sources are arranged in various orders. "Laser Arrangement" represents allocation of each of the R, G, and B laser beam sources to any of the first laser beam source 10₁, the second laser beam source 10₂, and the third laser beam source 10₃. "Output Intensity" represents the output intensity of a laser beam that has passed through zero or more optical elements. In this example, the transmittance of the optical element for a laser beam of each color is 90%. As in the case of the above-described example, the output of the red laser beam source is 150 mW and the required exposure period for which a recording medium is exposed with a laser beam emitted by the red laser beam source is 44 ms. The output of the green laser beam source is 300 mW and the required exposure period for which a recording medium is exposed with a laser beam emitted by the green laser beam source is 10 ms. The output of the blue laser beam source is 50 mW and the required exposure period for which a recording medium is exposed with a laser beam emitted by the blue laser beam source is 140 ms.

TABLE 1

| Laser Arrangement | | | Output Intensity (mW) | | | Actual Exposure Period (sec.) | | | Total Exposure Period |
|---|---|---|---|---|---|---|---|---|---|
| 3 | 2 | 1 | B | G | R | B | G | R | (sec.) |
| B | G | R | 40.500 | 270.000 | 150.000 | 0.173 | 0.009 | 0.040 | 0.222 |
| B | R | G | 40.500 | 300.000 | 135.000 | 0.173 | 0.008 | 0.044 | 0.225 |
| G | B | R | 40.500 | 243.000 | 150.000 | 0.156 | 0.010 | 0.040 | 0.206 |
| G | R | B | 50.000 | 243.000 | 135.000 | 0.140 | 0.010 | 0.044 | 0.194 |
| R | B | G | 45.000 | 300.000 | 121.500 | 0.156 | 0.008 | 0.049 | 0.213 |
| R | G | B | 50.000 | 270.000 | 121.500 | 0.140 | 0.009 | 0.049 | 0.198 |

As illustrated in Table 1, when the R, G, and B laser beam sources are arranged as in this exemplary embodiment so that a laser beam emitted from a laser beam source that exposes a recording medium with the laser beam for a longer required exposure period passes through a smaller number of optical elements, the total exposure period is 0.194 seconds, which is the shortest in the arrangements in various orders. This is because the actual exposure period does not exceed the required exposure period even when the output intensity is reduced after the laser beam passes through zero or more optical elements.

On the other hand, when a blue laser beam source is used as the first laser beam source 10₁, a green laser beam source is used as the second laser beam source 10₂, and a red laser beam source is used as the third laser beam source 10₃, it is understood that each actual exposure period increases and the total exposure period slightly increases to 0.198 seconds as a result of a reduction of the output intensities of red laser beams compared to the arrangement of the laser beam sources in the order according to this exemplary embodiment.

When a green laser beam source is used as the first laser beam source 10₁, a red laser beam source is used as the second laser beam source 10₂, and a blue laser beam source is used as the third laser beam source 10₃, it is understood that each actual exposure period increases and the total exposure period increases up to 0.225 seconds as a result of a reduction of the output intensities of blue laser beams compared to the arrangement of laser beam sources in the order according to this exemplary embodiment.

Specifically, when laser beam sources are arranged in the order according to this exemplary embodiment, it is understood that the total exposure period is shortened by 14% of the total exposure period obtained in the case where the laser beam sources are arranged in the order opposite to the order in the case of this exemplary embodiment, that is, the R, G, and B laser beam sources are arranged so that a laser beam emitted from a laser beam source exposing a recording medium with a laser beam for a longer required exposure period passes through a larger number of optical elements.

In the above-described example, the outputs of the laser beam sources have the following relationship: output of green laser beam source (300 mW)>output of red laser beam source (150 mW)>output of blue laser beam source (50 mW). However, this relationship is a mere example and the relationship of the outputs of the laser beam sources included in the recording device is not limited to this. Other arrangements are possible depending on the selection of laser beam sources. Nevertheless, among lasers having a large output, a blue laser is typically more expensive than lasers of other colors. Thus, using a blue laser beam source having a low output enhances cost reduction.

The configuration of the hologram recording device according to each exemplary embodiment is merely an example. The configuration may naturally be changed within a range not departing from the gist of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A hologram recording device comprising:
 a light outputting unit configured to sequentially output a plurality of laser beams having different wavelengths such that the laser beams are coaxial with one another, the light outputting unit including:
  an optical member that includes a plurality of optical elements arranged in an optical axis direction, the optical elements configured to reflect, in an optical direction, a first laser beam, of the plurality of laser beams, incident thereon in a direction crossing the optical axis direction, and the optical elements configured to allow a second laser beam, of the plurality of laser beams, incident thereon in the optical axis direction to pass therethrough, and
  a plurality of laser beam sources configured to emit the plurality of laser beams having different wavelengths, to radiate the laser beams to the optical member, and that are arranged so that third laser beam, of the plurality of laser beams, emitted from a laser beam source among the laser beam sources exposes a recording medium for a longer exposure period, than at least another of the plurality of laser beams, with the third laser beam passing through a smaller number of optical elements than the at least another of the plurality of laser beams; and
 a recording unit configured to sequentially irradiate the recording medium with the laser beams, which have different wavelengths, and which the light outputting unit is configured to sequentially output, so as to be coaxial with one another, for use as recording beams to record a plurality of holograms in a multiwavelength superimposing manner,
 wherein the light outputting unit includes:
  a first optical element configured to reflect, in the optical axis direction, the first laser beam incident thereon in a first direction, the first optical element is further configured to allow the second laser beam incident thereon in the optical axis direction to pass therethrough and outputting the second laser beam,
  a second optical element configured to reflect, in the optical axis direction, a fourth laser beam incident thereon in a second direction and to cause the fourth laser beam to be incident on the first optical element, the second optical element is further configured to allow a fifth laser beam incident thereon in the optical axis direction to pass therethrough and to cause the fifth laser beam to be incident on the first optical element,
  a first laser beam source configured to cause the first laser beam to be incident on the first optical element in the first direction,
  a second laser beam source configured to cause the fourth laser beam to be incident on the second optical element in the second direction, and
  a third laser beam source configured to cause the fifth laser beam to be incident on the second optical element in the optical axis direction,
 wherein, in a case in which the first laser beam, the fourth laser beam, and the fifth laser beam are emitted by respective ones of the first laser beam source, the second laser beam source and the third laser beam source, an exposure period for which the recording medium is exposed with the fifth laser beam is greater than the exposure period for which the recording medium is exposed with the fourth laser beam and the exposure period for which the recording medium is exposed with the fourth laser beam is greater than the exposure period for which the recording medium is exposed with the first laser beam, and
 wherein the first laser beam source is further configured to emit the first laser beam of a wavelength corresponding to a color blue, the second laser beam source is further configured to emit the fourth laser beam of a wavelength corresponding to a color red, and the third laser beam source is further configured to emit the fifth laser beam of a wavelength corresponding to a color green.

2. The hologram recording device according to claim 1, wherein the longer exposure period is an exposure period required to acquire a white hologram by additive mixing when at least one of the plurality of laser beams does not cause an optical loss after passing through a corresponding number of optical elements.

* * * * *